July 14, 1942.  F. J. YOUNG  2,289,618
SEALING DEVICE AND METHOD
Filed Jan. 16, 1940
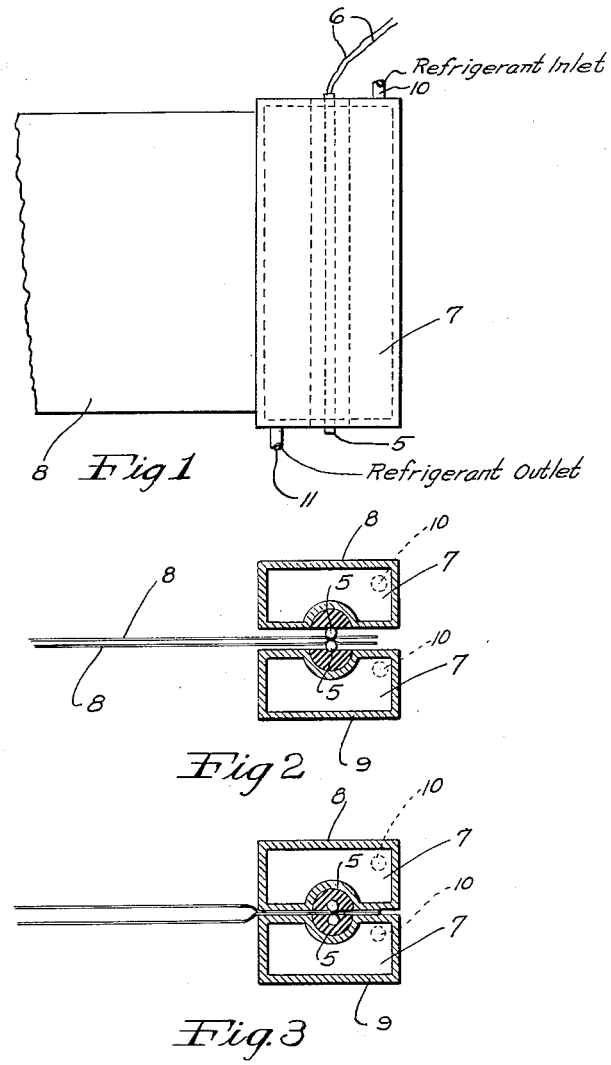
Inventor
Foster J. Young Patented July 14, 1942

2,289,618

UNITED STATES PATENT OFFICE 2,289,618

SEALING DEVICE AND METHOD

Foster J. Young, Kent, Ohio, assignor to Wingfoot Corporation, Wilmington, Del., a corporation of Delaware Application January 16, 1940, Serial No. 314,069

4 Claims. (Cl. 154—42)

This invention relates to the sealing of stretched film products which become distorted when subjected to the usual heat-sealing operations. It includes both the method of sealing and a device therefor. The invention will be described more particularly as applied to the heat-sealing of stretched rubber hydrochloride film products although it is not limited thereto but includes the treatment of other stretched film products, such as products made of stretched films of polymerized vinyl chloride.

It has been found, on sealing a sheet of stretched rubber hydrochloride film by the application of heat thereto, that the heat causes the film to retract. When a laminated film is heated, such as a film made by uniting two plies of stretched film so that the axes of stretch in the two plies are perpendicular, the retraction causes the film to curl. Film formed by laminating unstretched film to stretched film likewise curls on heating. Similarly, two-ply rubber hydrochloride film, one ply of which has been stretched more than the other ply, will curl on heating. All stretched film products are unbalanced, that is, there are stresses in them which are released on heating. The sealing device of the invention is designed for uniting such unbalanced films.

It is the object of this invention to provide for the heat-sealing of film products of such unbalanced rubber hydrochloride, etc., by applying heat to only the portion of the film which is to be sealed without heating the area adjacent the seal. Furthermore, the invention includes maintaining the sealed product in a stretched condition during and after the sealing, and cooling the film while so stretched. One device for accomplishing this purpose is shown in the drawing.

Fig. 1 is a plan view of the device showing its application to rubber hydrochloride film;

Fig. 2 is an elevation showing the plates of the device partially separated;

Fig. 3 shows the device with the plates closed.

The sealing device comprises sealing bars 5 which are adapted to be heated by electricity or other suitable means. Electric connections 6 for this purpose are shown in Fig. 1. In order to keep the film adjacent the sealing bars cool to prevent the film from curling, the cooling plates 7 are adapted to contact the rubber hydrochloride sheets 8 on both sides of the sealing bars 5. In Fig. 2 these cooling plates are shown somewhat separated. In Fig. 3 they are brought into intimate contact with the film.

The sealing bars 5 are backed with resilient cushioning material 9 which also serves as heat insulation to prevent transfer of heat from the bars 5 to the cooling means 7. The sealing bars 5 are so positioned with relation to the cooling plates that as the plates come together the sealing bars recede into the cushioning material 9. This is shown in Figs. 2 and 3.

In the drawing an inlet 10 and outlet 11 are provided for the circulation of brine or other refrigerant through the cooling plates. Instead of cooling in this manner, plates which are not hollow may be used as cooling plates. These may be provided with fins which are cooled by a blast of air. Any suitable cooling plates may be utilized.

To operate the device, the two sheets of rubber hydrochloride material which are to be united by heat are placed between the cooling plates 7 in such a way that when the plates are brought together the sealing bars 5 will press against the film at the place where the seal is desired. With the films between the cooling plates, the plates are then brought together as shown in Fig. 3. The electric current is then turned on so that the sealing bars are momentarily heated and the film is softened to the point where the two sheets of film are united under the pressure applied. The current is then turned off and the plates are separated. In this way, the film adjacent the line of seal is kept cool while the seal is formed.

If the seal is desired at the edge of the film, the cooling plate will contact the film on only one side of the seal. Where the film extends on both sides of the film and cooling on both sides is desired, the cooling plates will contact the film on both sides of the seal as shown in the drawing. The film is clamped tightly between these cooling plates so that the film cannot retract during the sealing operation. It is preferably held between the clamps while the film is heated, i. e., until after the heated sealing means is withdrawn from contact with the film.

The arrangement shown is the preferred arrangement. Instead of a single heating bar several bars may be provided, or one may employ a single bar with several knife-like edges protruding from it. These knife-like edges may be used to produce several hair-line seals. Any suitable heat-sealing device may be used. The sealing bars may, if desired, be flush with the cooling plates and the resilient means 9 may then be omitted. Or the device may be so designed that the cooling plates are first brought into contact, and the bars are then brought together to form the seal.

Although in the preferred method of use the current leading to the sealing bar is turned on and off while the cooling plates are in contact with the film, this is not essential. The current may flow continuously through the sealing bar if the cooling plates are maintained at a sufficiently low temperature.

Although the invention has been described particularly with respect to the sealing of unbalanced films of rubber hydrochloride, it includes the heat-sealing of other thermoplastic film which has been similarly unbalanced by stretching.

I claim:

1. The method of uniting a plurality of plies of unbalanced thermoplastic film, which comprises heating the film where the union is to be formed while cooling areas of the film adjacent the heated area.

2. The method of uniting a plurality of plies of unbalanced thermoplastic film, which comprises heating the film where the union is to be formed while cooling areas of the film adjacent the heated area and holding the film taut while it is warm.

3. The method of uniting a plurality of plies of rubber hydrochloride film at least one of which is an unbalanced film, which comprises pressing the plies together where union is desired, and heating the plies by the pressure means, while simultaneously cooling areas adjacent the heated area of the film by contact with cooling means.

4. The method of uniting a plurality of plies of rubber hydrochloride film at least one of which is an unbalanced film, which comprises pressing the plies together where union is desired, and heating the plies by the pressing means, while simultaneously cooling areas adjacent the heated area of the film by contact with cooling means and holding the plies taut while they are heated.

FOSTER J. YOUNG.